United States Patent
Ohlson et al.

(10) Patent No.: US 8,056,882 B2
(45) Date of Patent: Nov. 15, 2011

(54) GATE VALVE WITH LUBRICATED SECONDARY SEAL

(75) Inventors: Robert Kent Ohlson, Reno, NV (US);
David L Gambetta, Reno, NV (US);
Christopher Eric Cooper, Sparks, NV (US)

(73) Assignee: Tyco Valves & Controls LP, Houston, TX (US)

( * ) Notice: Subject to any disclaimer, the term of this patent is extended or adjusted under 35 U.S.C. 154(b) by 375 days.

(21) Appl. No.: 12/399,672

(22) Filed: Mar. 6, 2009

(65) Prior Publication Data

US 2010/0224814 A1    Sep. 9, 2010

(51) Int. Cl.
*F16K 3/00* (2006.01)
(52) U.S. Cl. ........................ 251/326; 251/355
(58) Field of Classification Search .................. 251/326, 251/355
See application file for complete search history.

(56) References Cited

U.S. PATENT DOCUMENTS

| | | | | |
|---|---|---|---|---|
| 3,050,077 | A | * | 8/1962 | Wheatley ........................ 137/312 |
| 3,071,343 | A | * | 1/1963 | Milleville ........................ 251/175 |
| 3,778,030 | A | * | 12/1973 | Carlin ........................ 251/327 |
| 4,340,204 | A | * | 7/1982 | Herd ........................ 251/327 |
| 5,150,881 | A | | 9/1992 | McKavanagh |
| 5,338,006 | A | | 8/1994 | McCutcheon et al. |
| 5,341,835 | A | | 8/1994 | Lanning, II |
| 5,890,700 | A | | 4/1999 | Clarkson et al. |

* cited by examiner

*Primary Examiner* — John Fristoe, Jr.

(57) ABSTRACT

A gate valve includes a pair of opposing housing members, a gate, primary sealing sleeves and a secondary sealing member. The primary sealing sleeves are disposed in each of the housing members. The gate is configured to slidably pass through a transverse gate chamber defined when the housing members are joined together. The secondary sealing member is secured between the housing members and includes at least one passage or aperture configured to allow lubricating fluid to be applied through at least one of the housing members through the secondary sealing member and onto the gate.

20 Claims, 4 Drawing Sheets

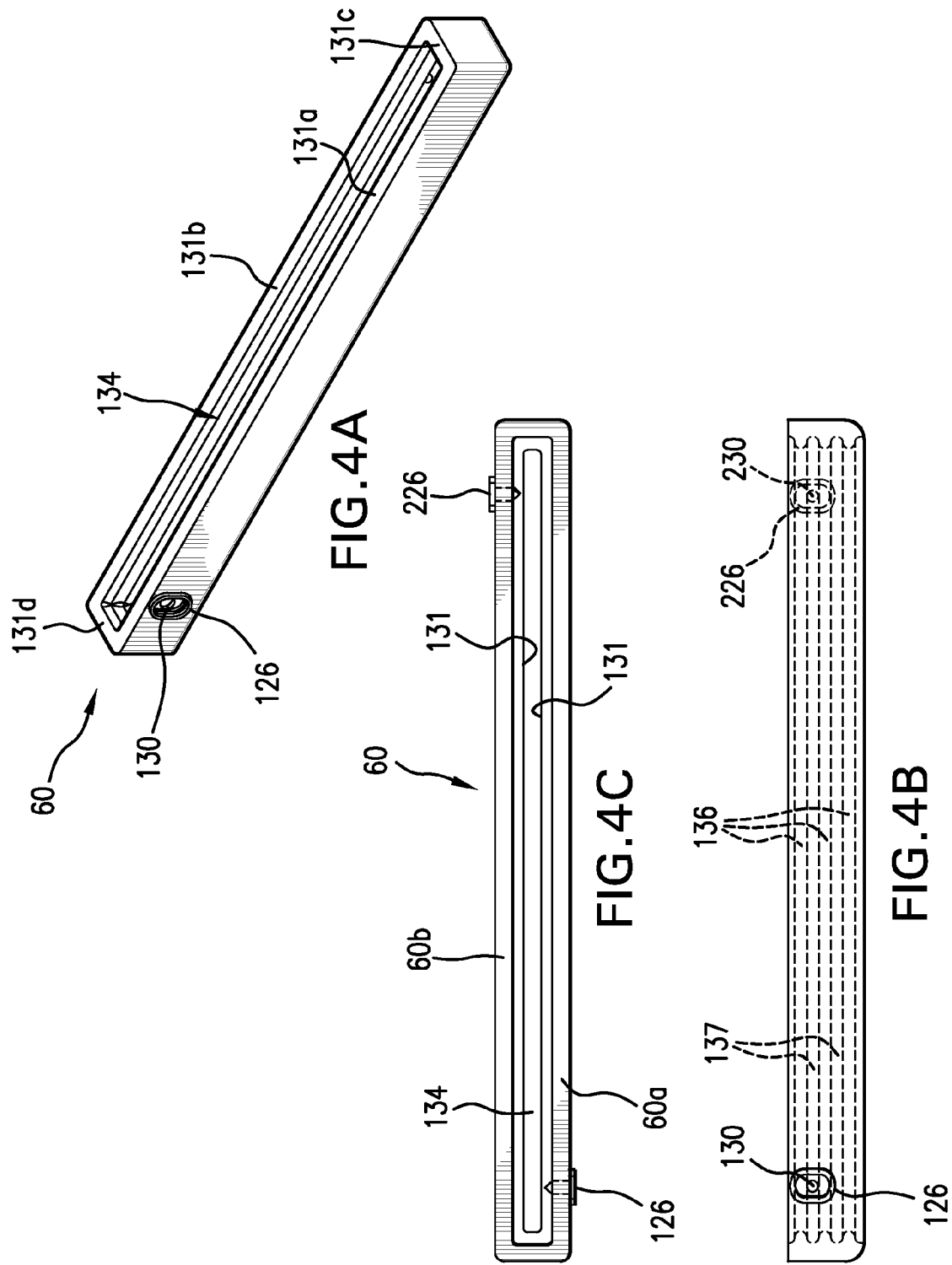

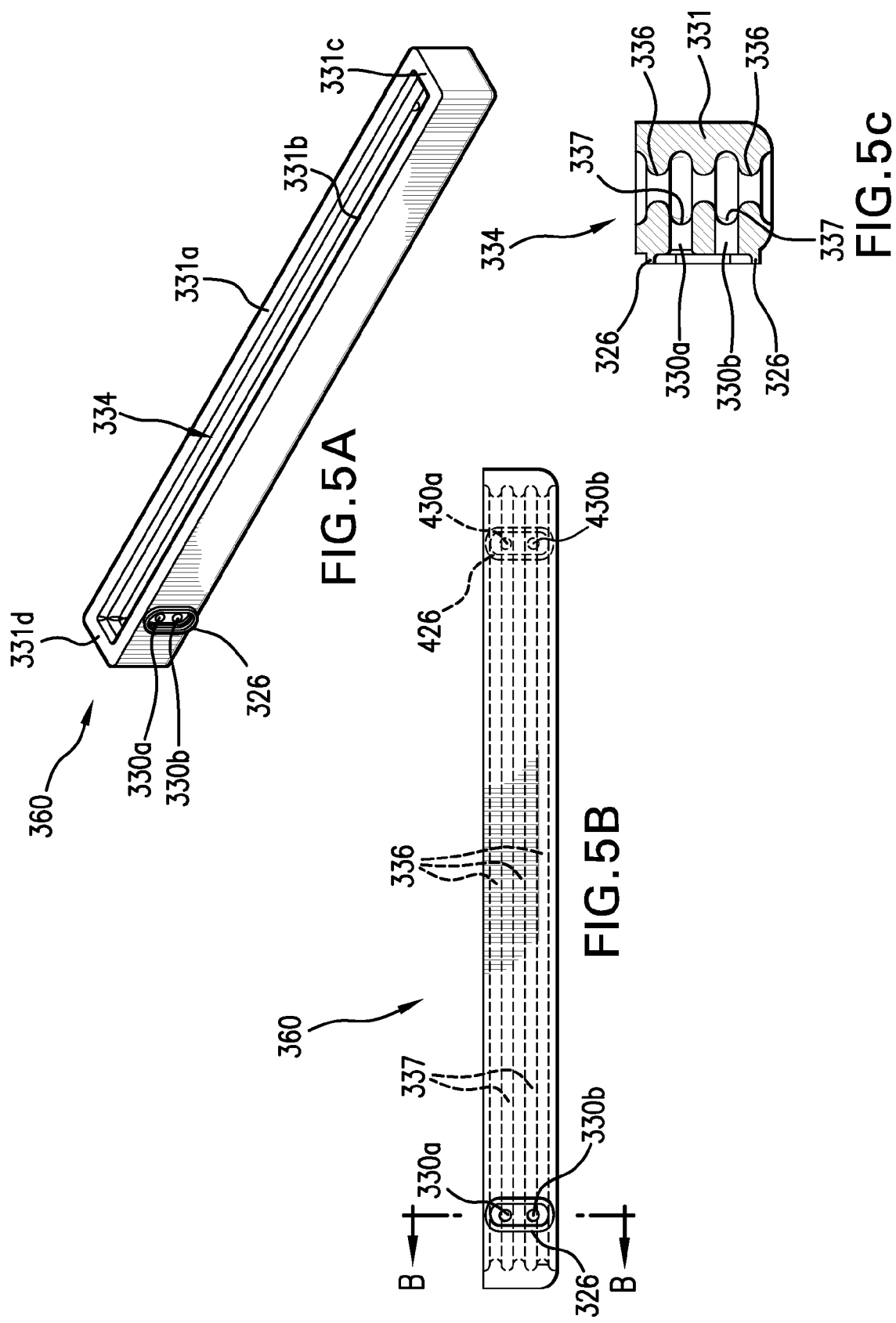

GATE VALVE WITH LUBRICATED SECONDARY SEAL

BACKGROUND OF THE INVENTION

1. Field of the Invention

Embodiments of the invention relate to the field of valves used to control the flow of process media. More particularly, the present invention relates to an apparatus for providing lubricant to a secondary seal of a process valve in situ without the need for disassembly and re-assembly.

2. Discussion of Related Art

Gate valves or knife gate valves are disposed within a pipeline to control the flow of process media. Knife gate valves are particularly adapted for abrasive slurries, but may be used for any fluid process control. These types of valves get their name from the vertical movement of a gate between open and closed position. Movement of the gate is controlled by an actuator which may be manually driven or may be automated. The gate slides between a pair of opposed sealing sleeves disposed within a housing which is attached to the process pipeline through the use of flanges and mounting fasteners. During valve operation, the sealing sleeves move axially coming together when the gate is lifted to an open position and separating when the gate drops into a closed position.

A secondary seal, in addition to the primary seals, may also be employed to engage the gate during the valve cycle. The secondary seal acts to prevent process media which may seep through the primary sleeves from leaking around the gate or toward the actuator end of the valve. To promote cohesive sliding of the gate during operation, lubricating fluid has been applied to grooves within the secondary seal and applied to the gate as the gate traverses through the secondary seal. Gate lubrication provides smoother gate action and longer seal life as well as reducing the amount of force necessary to actuate the gate. However, once this lubricant is depleted, the secondary seals had to be removed from the valve in order to provide additional lubricant. In particular, the valve was disassembled, the secondary seals were removed, lubricant was added, the secondary seals were re-installed and the valve was reassembled with the added lubricant in the secondary seals. This required process line down-time which negatively impacted manufacturing processes.

SUMMARY OF THE INVENTION

Exemplary embodiments of the present invention are directed to an apparatus for providing lubricant to a secondary seal of a process valve in situ without the need for valve disassembly and re-assembly. In an exemplary embodiment, a gate valve includes first and second opposing housing members each having coaxial through passages. The housing members define a transverse gate chamber when the housing members are joined together. A gate is disposed within the transverse gate chamber and slidable therein from an open position in which the gate does not block fluid flow through the passages, and a closed position in which the gate is interposed between the passages. A first annular primary sealing sleeve is disposed within the first housing member and a second annular primary sealing sleeve is disposed within the second housing member. Each of the first and second annular primary sealing sleeves is adapted to sealingly engage each other under compression in the open position of the valve, and with the gate when the valve is closed. A secondary sealing member is aligned with the gate chamber and secured between the housing members above the first and second annular primary sealing sleeves. The secondary sealing member also has an inner peripheral wall adapted to sealingly engage the gate and an aperture extending through the peripheral wall. An inlet channel is disposed through at least one of the first or second housing members and is aligned with the aperture of the secondary sealing member. The inlet channel is configured to provide lubricating fluid through the aperture of the secondary sealing member to the gate.

BRIEF DESCRIPTION OF THE DRAWINGS

FIGS. 4A-4C illustrates various views of an exemplary secondary sealing member in accordance with an embodiment of the present invention.

FIG. 5A-5C illustrates an alternative embodiment of the secondary sealing member in accordance with the present invention.

DESCRIPTION OF EMBODIMENTS

Figure 1:
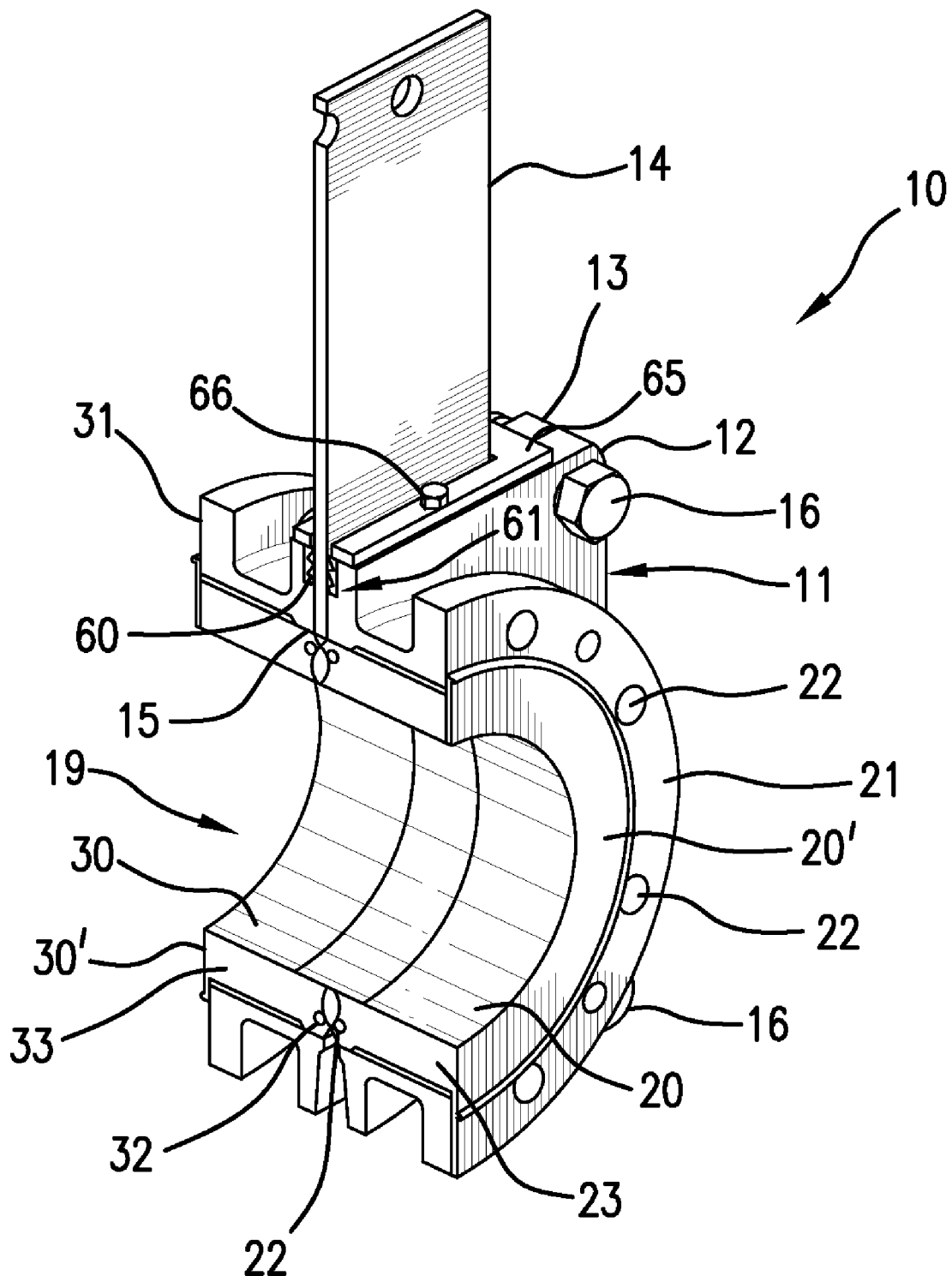
FIG. 1 is a perspective cross-sectional view of an exemplary embodiment of a valve in accordance with the present invention.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 is a perspective cross-sectional view of an exemplary embodiment of a valve 10 in accordance with the present invention. Valve 10 includes a housing 11 defining an interior pathway 19 through which process media flows. Housing 11 is comprised of first and second opposed halves 12 and 13 having, for example, generally "U" shaped cross sections which provide a narrow chamber or space of sufficient width to allow a gate 14 to pass therethrough. Half 12 is rigidly connected to half 13 via a series of bolts 16 extending through the respective halves. Housing half 12 includes an outer flange 21 having a series of mounting holes 22 for attachment to a process pipeline. Similarly, housing half 13 includes an outer flange 31 having a series of mounting holes (not shown) for attachment to a process pipeline. Primary sealing sleeves 20 and 30 are mounted in respective housing halves 12 and 13. In particular, primary sealing sleeve 20 is mounted in housing half 12 and primary sealing sleeve 30 is mounted in housing half 13. The movable gate 14 is disposed between primary sealing sleeves 20 and 30 to open and close valve 10 and allow or prevent process media from flowing through valve 10. Gate 14 is shown in FIG. 1 in the open position. Sleeves 20 and 30 include annular resilient bodies 23 and 33 respectively made from an elastomeric material such as natural rubber or other suitable synthetic elastomer. Sleeve 20 is reinforced at its inner end by an annular shaped stiffener ring 22 which extends around the circumference of the sleeve. Similarly, sleeve 30 is reinforced at its inner end by an annular shaped stiffener ring 32 which extends around the circumference of the sleeve. Each of the stiffener rings may be formed from a durable material such as steel, hard polyurethane, etc. Sealing sleeve 20 includes an edge portion 20' which also contributes to the seal of valve 10 and the process pipeline attached to outer flange 21. Sealing sleeve 30 also includes an edge portion 30' which contributes to the seal of valve 10 and the process pipeline attached to outer flange 31.

The first and second halves 12 and 13 define a secondary sealing slot 61 within which a secondary resilient sealing member 60 is disposed. Secondary sealing member 60 is a unitary molded elastomeric material such as natural rubber or other suitable synthetic elastomer such as polyurethane. Secondary sealing member 60 replaces standard packing material around gate 14 to prevent leakage and to wipe excess process media from gate 14 as the gate moves between open and closed positions. Secondary sealing member 60 is secured to housing 11 by secondary seal retainer plate 65 having a generally rectangular shape around the perimeter of gate 14 and a plurality of bolts 66. While the primary sleeves 20, 30 prevent direct slurry line pressure on the secondary sealing member 60, the secondary seal member 60 is itself capable of withstanding process media spray during actuation of gate 14. Since the secondary seal 60 is thus dynamically self-adjusting, there is no need for constant manual adjustment such as in the case of conventional packing in order to stop valve leakage. The primary sealing sleeves 20 and 30, stiffener rings 22 and 32 as well as secondary sealing member 60 is described in more detail in U.S. Pat. No. 5,890,700, the entire contents of which are incorporated herein by reference.

Figure 2:
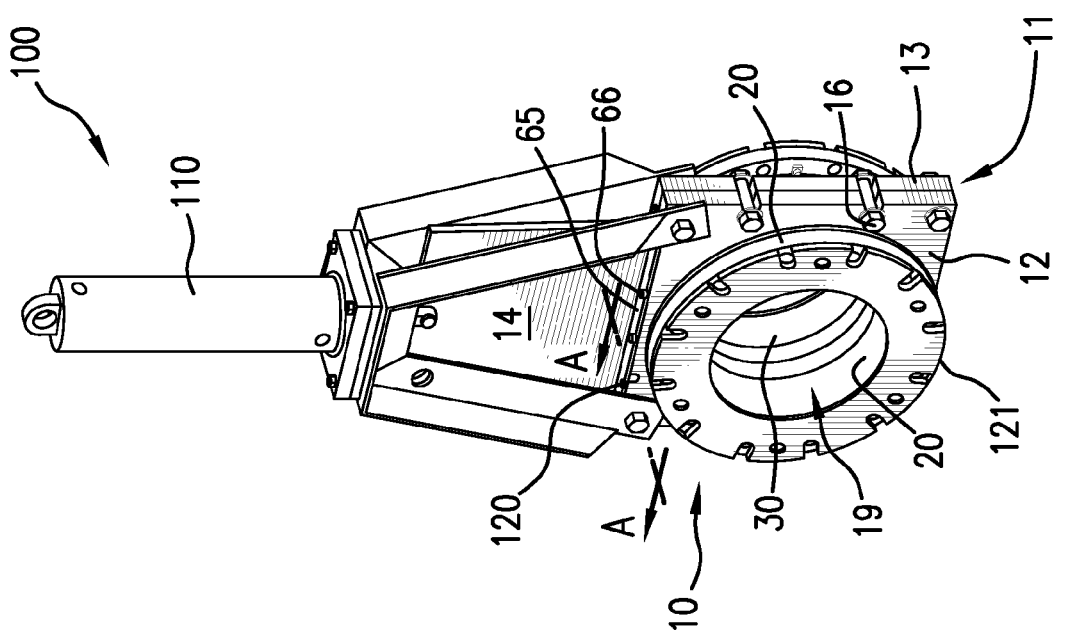
FIG. 2 is a perspective view of an exemplary valve assembly in accordance with the present invention.

FIG. 2 is a perspective view of a valve assembly 100 including valve 10 and piston housing 110 disposed at the upper end of the assembly. Piston housing 110 includes a piston rod (not shown) which is attached to gate 14 for displacing the gate to open and close process media pathway 19. Valve housing 11 is defined by housing halves 12 and 13 with sealing edge portion 20' disposed between pipe flange 121 and housing 12. Although the cross section of housing halves 12 and 13 may have a different cross section from that shown in FIG. 1, the opposing housing halves are rigidly connected via a series of bolts 16 extending through the respective halves. Primary sealing sleeves 20 and 30 are mounted in respective housing halves 12 and 13. Valve 10 also includes secondary sealing member 60 (not shown) disposed above the primary sealing sleeves 20 and 30 as will be seen with reference to FIG. 3 which is a cut-away view taken along lines A-A. The secondary sealing member is secured by secondary seal retainer plate 65 and a series of bolts 66. One or both of the housing halves 12, 13 includes an inlet fitting 120 (shown in FIG. 2 through housing half 12) which allows access to an inlet passage for providing lubricating fluid such as grease, oil, or the like directed toward gate 14 to promote cohesive sliding of the gate within housing 11. Gate lubrication provides smoother gate action and longer seal life as well as reducing the amount of force necessary to actuate the gate.

Figure 3:
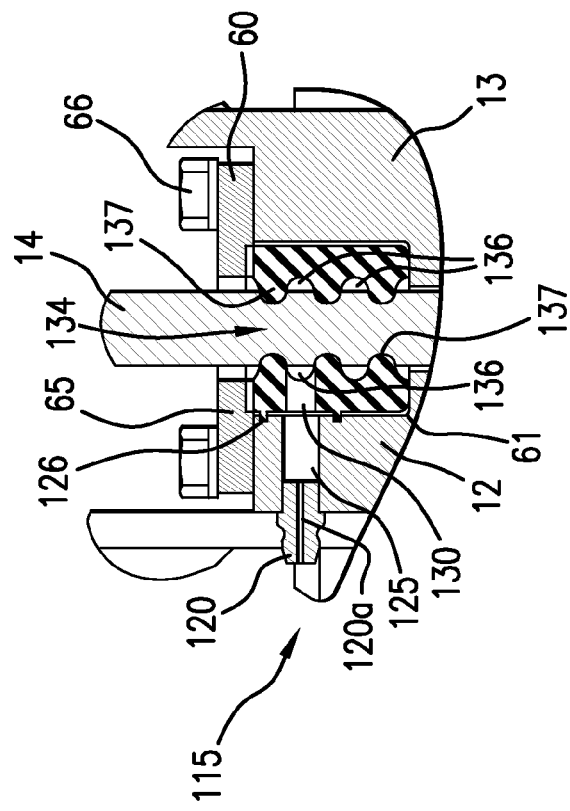
FIG. 3 is a cross sectional view of an inlet assembly in accordance with an embodiment of the present invention.

FIG. 3 is a cut-away cross sectional view of an inlet assembly 115 taken along lines A-A of housing 11. Assembly 115 includes fitting 120, channels 125 and aperture 130 which extends through secondary sealing member 60 toward gate 14. Secondary sealing member 60 is disposed within secondary sealing slot 61 between housing halves 12 and 13. A fitting 120, such as a zerk fitting, is at least partially disposed within channel 125 through housing half 12. Fitting 120 includes an axially aligned bore 120a which opens into channel 125 which allows lubricating fluid to flow in one direction (e.g. one way check valve) toward gate 14. Aperture 130 extends through secondary sealing member 60 and is aligned with channel 125 of housing half 12. Secondary sealing member 60 also includes a sealing dam 126 which comprises a ridge around channel 125 to form a seal with housing half 12. The dam 126 prevents lubricating fluid from leaking between secondary sealing member 60 and the respective housing half, in this case housing half 12. In addition, dam 126 prevents the process media flowing through valve 10 from entering into inlet assembly 115 Although FIG. 3 illustrates a single channel 125, assembly 115 may include a first and second passage through secondary sealing member 60 as shown in more detail with reference to FIGS. 5A-5C. Secondary sealing member 60 includes inner peripheral walls 131 which lines the interior passage 134 through which gate 14 travels. The inner peripheral walls 131 include a plurality of ribs 136 which sealingly engage the circumference of gate 14 and a plurality of grooves 137 which are capable of retaining the lubricating fluid introduced through inlet assembly 115. The lubricating fluid may be, for example, a lithium based grease. As shown in U.S. Pat. No. 5,890,700, the secondary sealing member is installed within the valve assembly with lubricating fluid disposed in the grooves. However, once the lubricating fluid dissipates through the opening and closing of the gate, the secondary seal must be removed from the valve to apply new lubricant to the grooves. As noted earlier, this requires process line down-time to disassemble the secondary seal portion of the valve, install additional lubrication and reassembly of the valve. By using inlet assembly 115, fluid lubricant may be introduced into the secondary sealing member in situ and consequently the gate 14 without costly process down-time, disassembly and reassembly of the valve 10.

FIGS. 4A-4C illustrate secondary sealing member 60 having a generally rectangular cross-section and an interior passage 134 to allow passage of gate 14. FIG. 4A is a perspective view of secondary sealing member 60 having an interior peripheral wall 131 defined by a pair of longitudinally extending members 131a and 131b and a pair of transversely extending members 131c and 131d. A single aperture 130 surrounded by dam 126 extends through peripheral wall 131a. Again, a fitting 120 is partially disposed within housing half 12 and aligned with channel 125 to supply lubricating fluid to aperture 130 and onto gate 14. FIG. 4B is a side plan view of secondary sealing member 60 showing ribs 136 and grooves 137 (in shadow) extending around the interior peripheral wall 131. Secondary sealing member 60 includes a first aperture 130 extending through peripheral wall member 131a and a second aperture 230 (shown in shadow) extending through peripheral wall member 131b to provide lubricating fluid to opposing sides of gate 14. Secondary sealing member 60 also includes a first dam 126 surrounding the opening of first aperture 125 and a second dam 226 surrounding the opening of second aperture 230. As can be seen, apertures 130 and 230 are aligned with a particular one of the grooves 137 of inner peripheral wall 131a and 131b respectively to introduce lubricating fluid toward gate 14. However, the passages may be aligned with any one of the grooves 137 and/or with different grooves as desired. Although the placement of apertures 130 and 230 are shown as being disposed toward respective ends of sealing member 60, the placement of these passages may only be restricted by user accessibility to the corresponding fitting (e.g. 120) around valve assembly elements. FIG. 4C illustrates a top plan view of secondary sealing member 60 having interior passage 134 through which gate 14 travels. The peripheral inner walls 131 of secondary sealing member 60 sealingly engage the circumference of gate 14 to prevent leakage and to wipe excess process media from gate 14 as it traverses the inner peripheral wall 131. This configuration of sealing member 60 has a first dam 126 disposed through one wall 60a and a second dam 226 disposed through a second opposed wall 60b. Lubricating fluid is introduced into bore 126 or fitting 120 which flows into channel 125 through housing 12, into aperture 130 of secondary sealing member 60 toward rib 136 and into contact with gate 14.

FIGS. 5A-5C illustrate an alternative embodiment of secondary sealing member 360 having a generally rectangular cross-section. FIG. 5A is a perspective view of secondary sealing member 360 having an interior passage 334 defined by inner peripheral wall 331 which is comprised of a pair of longitudinally extending walls 331a and 331b and a pair of transversely extending walls 331c and 331d. Sealing member 360 includes first and second apertures 330a and 330b extending through peripheral wall 331a which are both surrounded by dam 326. FIG. 5B is a side plan view showing first and second apertures 330a and 330b surrounded by dam 326 and third and fourth apertures 430a and 430b surrounded by dam 426 (shown in shadow). Ribs 336 and grooves 137 (in shadow) extend around the interior peripheral wall 331. First and second apertures 330a, 330b and third and fourth apertures 430a and 430b provide lubricating fluid to opposing sides of gate 14. As can be seen, each of the apertures 330a and 430 are aligned with a particular one of the grooves 337 of the inner peripheral wall 331. Similarly, each of the apertures 330b and 430b are aligned with a particular one of the grooves 337. However, the apertures may be aligned with any one of the grooves 337 and/or with different grooves as desired. Similar to the apertures shown with reference to FIG. 4B, the placement of apertures 330a, 330b, 430a and 430b are shown as being disposed toward respective ends of sealing member 360, the placement of these passages may only be restricted by user accessibility to the corresponding fittings around valve assembly elements to supply lubricating fluid thereto. FIG. 5C is a cross sectional cut-away view taken along lines B-B of FIG. 5B. First and second apertures 330a and 330b are aligned with grooves 337 and surrounded by dam 326. As lubricating fluid is supplied to apertures 330a and 330b, the fluid flows toward grooves 337 and into interior passage 334 through which gate 14 travels, thereby lubricating the gate. In this manner, a plurality of apertures may be configured through secondary sealing member 360 to provide fluid lubricant to the valve gate without requiring costly process down-time, disassembly and reassembly.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A gate valve comprising
a first and second opposing housing members each having coaxial through passages, each of said housing members defining a transverse gate chamber when said housing members are joined together;
a gate disposed within said transverse gate chamber and slidable therein from an open position in which the gate does not block fluid flow through the passages, and a closed position in which the gate is interposed between the passages;
a first annular primary sealing sleeve disposed within said first housing member;
a second annular primary sealing sleeve disposed within said second housing member, each of said first and second annular primary sealing sleeves adapted to sealingly engage each other under compression in the open position of the valve, and with the gate when the valve is closed;
a secondary sealing member aligned with said gate chamber and secured between said housing members above the first and second annular primary sealing sleeves, said secondary sealing member further having an inner peripheral wall adapted to sealingly engage the gate, said secondary sealing member having an aperture extending therethrough;
an inlet channel disposed through at least one of said first or second housing members and aligned with said aperture of said secondary sealing member, said inlet channel being configured to provide lubricating fluid through said aperture of said secondary sealing member to said gate; and
a fitting having a first opening, a second opening and an axially aligned bore connecting said first and second openings, said fitting at least partially disposed within said inlet channel, said fitting configured to receive lubricating fluid at said first opening, supplying said lubricating fluid through said bore to said second opening and to said inlet channel.

2. The gate valve of claim 1 wherein each of the primary sleeve units being in the form of an axially deformable annular body of elastomeric material.

3. The gate valve of claim 1 wherein said secondary sealing member is in the form of a unitary deformable body of elastomeric material having an interior passage through which said gate passes.

4. The gate valve of claim 1 wherein said inner peripheral edge of said secondary sealing member having alternating ribs and grooves such that said ribs sealingly engage the gate and at least one of said grooves is aligned with said aperture of said secondary sealing member to receive said lubricating fluid.

5. The gate valve of claim 1 wherein said secondary sealing member further comprises a dam surrounding an opening to said aperture, said dam extending outward from said secondary sealing member.

6. The gate valve of claim 1, wherein the fitting comprises a one-way valve.

7. The gate valve of claim 1, wherein said aperture of said secondary sealing member is a first aperture, said secondary sealing member having a second aperture extending through said secondary sealing member.

8. The gate valve of claim 7, wherein the fitting is in communication with both of said first and second apertures.

9. A gate valve comprising
a first and second opposing housing members each having coaxial through passages, each of said housing members defining a transverse gate chamber when said housing members are joined together;
a gate disposed within said transverse gate chamber and slidable therein from an open position in which the gate does not block fluid flow through the passages, and a closed position in which the gate is interposed between the passages;
a first annular primary sealing sleeve disposed within said first housing member;
a second annular primary sealing sleeve disposed within said second housing member, each of said first and second annular primary sealing sleeves adapted to sealingly engage each other under compression in the open position of the valve, and with the gate when the valve is closed;

a secondary sealing member aligned with said gate chamber and secured between said housing members above the first and second annular primary sealing sleeves, said secondary sealing member further having an inner peripheral wall adapted to sealingly engage the gate, said secondary sealing member having an aperture extending therethrough; and an inlet channel disposed through at least one of said first or second housing members and aligned with said aperture of said secondary sealing member, said inlet channel being configured to provide lubricating fluid through said aperture of said secondary sealing member to said gate;

wherein said secondary sealing member further comprises a dam surrounding an opening to said aperture, said dam extending outward from said secondary sealing member and disposed between at least one of said first or second housings and said secondary sealing member.

10. The gate valve of claim 9 wherein said inlet channel is a first inlet channel, said valve further comprising a second inlet channel disposed through at least one of said first or second housing members and aligned with said second aperture of said secondary sealing member, said second inlet channel being configured to provide lubricating fluid through said second aperture of said secondary sealing member to said gate.

11. The gate valve of claim 10 further comprising a fitting having a first opening, a second opening and an axially aligned bore connecting said first and second openings, said fitting at least partially disposed within said second inlet channel, said fitting configured to receive lubricating fluid at said first opening, supplying said lubricating fluid through said bore to said second opening and to said second inlet channel.

12. The gate valve of claim 9 wherein said inner peripheral edge of said secondary sealing member having alternating ribs and grooves such that said ribs sealingly engage the gate and at least one of said grooves is aligned with said second aperture of said secondary sealing member to receive said lubricating fluid.

13. The gate valve of claim 9 further comprising a fitting having a first opening, a second opening and an axially aligned bore connecting said first and second openings, said fitting at least partially disposed within said inlet channel, said fitting configured to receive lubricating fluid at said first opening, supplying said lubricating fluid through said bore to said second opening and to said inlet channel.

14. The gate valve of claim 13 wherein said fitting comprises a one-way valve.

15. The gate valve of claim 13 wherein the fitting is in communication with both of said first and second apertures.

16. The gate valve of claim 9 said aperture of said secondary sealing member is a first aperture, said secondary sealing member having a second aperture extending through said secondary sealing member.

17. A gate valve comprising
a first and second opposing housing members each having coaxial through passages, each of said housing members defining a transverse gate chamber when said housing members are joined together;
a gate disposed within said transverse gate chamber and slidable therein from an open position in which the gate does not block fluid flow through the passages, and a closed position in which the gate is interposed between the passages;
a first annular primary sealing sleeve disposed within said first housing member;
a second annular primary sealing sleeve disposed within said second housing member, each of said first and second annular primary sealing sleeves adapted to sealingly engage each other under compression in the open position of the valve, and with the gate when the valve is closed;
a secondary sealing member aligned with said gate chamber and secured between said housing members above the first and second annular primary sealing sleeves, said secondary sealing member further having an inner peripheral wall adapted to sealingly engage the gate, said secondary sealing member having an aperture extending therethrough; and
an inlet channel disposed through at least one of said first or second housing members and aligned with said aperture of said secondary sealing member, said inlet channel being configured to provide lubricating fluid through said aperture of said secondary sealing member to said gate;
wherein said aperture of said secondary sealing member is a first aperture, said secondary sealing member having a second aperture extending through said secondary sealing member.

18. The gate valve of claim 17 wherein said secondary sealing member further comprises a dam surrounding an opening to at least one of said first and second apertures, said dam extending outward from said secondary sealing member 19. The gate valve of claim 17 further comprising a fitting having a first opening, a second opening and an axially aligned bore connecting said first and second openings, said fitting at least partially disposed within said inlet channel, said fitting configured to receive lubricating fluid at said first opening, supplying said lubricating fluid through said bore to said second opening and to said inlet channel.

20. The gate valve of claim 17 wherein the fitting is in communication with both of said first and second apertures.

* * * * *